United States Patent

[11] 3,621,394

| | | |
|---|---|---|
| [72] | Inventor | Knud Knudsen<br>Los Altos Hills, Calif. |
| [21] | Appl. No. | 1,582 |
| [22] | Filed | Jan. 9, 1970 |
| [45] | Patented | Nov. 16, 1971 |
| [73] | Assignee | Hewlett-Packard Company<br>Palo Alto, Calif. |
| [32] | Priority | Jan. 24, 1969 |
| [33] | | Japan |
| [31] | | 44/04814 |

[54] TRANSISTOR NOISE MEASURING CIRCUIT
1 Claim, 3 Drawing Figs.

[52] U.S. Cl. .................................................. 324/158 T
[51] Int. Cl. ................................................... G01r 31/22
[50] Field of Search ....................................... 324/158,
158 T; 307/230, 310

[56] References Cited
UNITED STATES PATENTS
3,041,537  6/1962  Cagle et al. ................ 324/158 T
2,935,684  5/1960  Lanning ...................... 324/158 T

*Primary Examiner* — Eli Lieberman
*Attorney* — A. C. Smith

ABSTRACT: A plurality of serially connected, forward-biased diodes and a resistor supply base current from a voltage supply to a transistor under test. Bias circuit impedance is thus maintained high so that the transistor's output noise is primarily due to the transistor's equivalent input current noise and not to the transistor's equivalent input voltage noise nor to the noise generated in the bias network.

PATENTED NOV 16 1971　　3,621,394

TRANSISTOR NOISE MEASURING CIRCUIT

BACKGROUND OF THE INVENTION

It is convenient in analyzing circuit designs and circuit operations if noise produced by a transistor in operating condition is represented by means of two noise sources connected to the input terminals. As an example of this way of representation FIG. 1 shows a common emitter connected bipolar transistor with all internal noise sources represented by the noise voltage source, $e_N$, and the noise current source, $i_N$. In order to measure the noise contribution from $i_N$ alone one has to measure the noise at the transistor's output terminals while the input terminals are open circuited. But in order actually to make a transistor operate at a prescribed condition, a bias source must be inserted into the base-emitter circuit of the transistor under test and a prescribed base current must be supplied to the base. It is impossible, therefore, to conduct measurement ideally under an open base condition. The open base condition must therefore be approximated, and two requirements on the network which feeds the base current to the transistor under test must be met: (1) the network must have an impedance which is much larger than the highest expected value of $e_N/i_N$ of the transistor under test for the specified bias condition, and (2) it must generate much less noise than the minimum expected value of $i_N$ of the transistor under test for the specified bias condition. In FIG. 2 where a resistor 5 is used to feed the base current to a bipolar transistor under test above requirements are met if the resistor value is much larger than $(2KT)/(qI_B)+r_b' = (50 \text{ mv.})/(I_B)+r_b'$ where $k$ is Boltzmann's constant, $T$ the absolute temperature, $q$ the electron charge, $I_B$ the DC base current and $r_b'$ the intrinsic base resistance. Therefore, the voltage drop developed across resistor 5 by $X I_B$ must be much larger than 50 mv. Let the minimum value of said voltage drop be, said 2 volts. Clearly for the reason of practical limitation on the supply 6 a single value of resistor 5 is not feasible when the value of the base bias current is expected to vary considerably more than one order of magnitude.

SUMMARY OF THE INVENTION

In the present invention the resistor 5 in FIG. 2 is replaced by a series connection of a plurality of diodes and a resistor. The base current passes through the diodes in their forward conduction direction. Using an appropriate number of suitable diodes and an appropriate resistor value the series connection of diodes and resistor will have an impedance large enough that for measurement of noise from a bipolar transistor the contribution from $e_N$ will be much smaller than the contribution from $i_N$ for a wide range of base current. Also the noise current generated in the series connection will be much smaller than the minimum possible value of $i_N$ for a wide range of base current.

The range of voltage variation across the series combination will be much smaller than the range of base current because the voltage drop across the diodes is a logarithmic function of current. Therefore the limitation encountered when using only a resistor 5 as in FIG. 2 has been overcome.

DESCRIPTION OF THE PREFERRED EMBODIMENT

Figure 1:
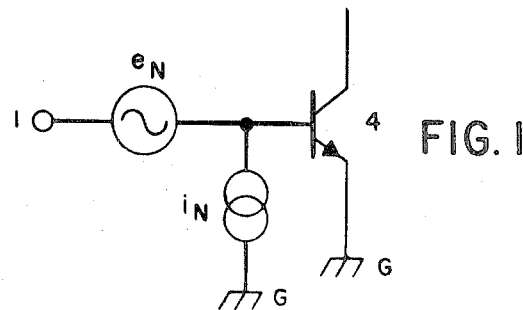
FIG. 1 is an equivalent circuit related to noise of transistors.
Figure 2:
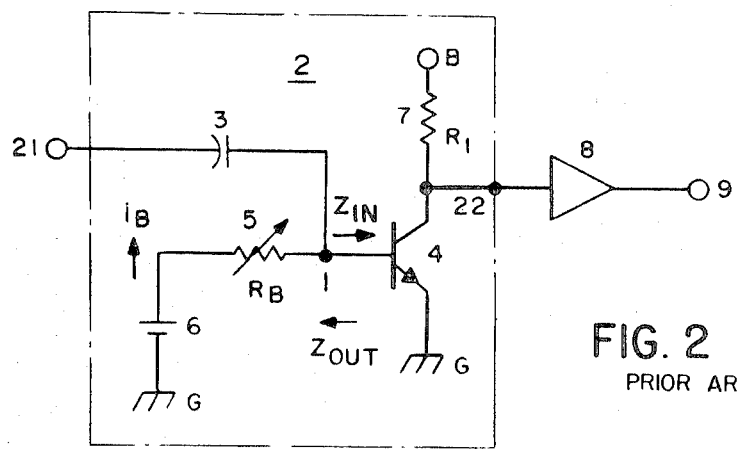
FIG. 2 is a schematic diagram of the structure of a conventional and known circuit for measuring the input current noise, $i_N$, of a transistor.
Figure 3:
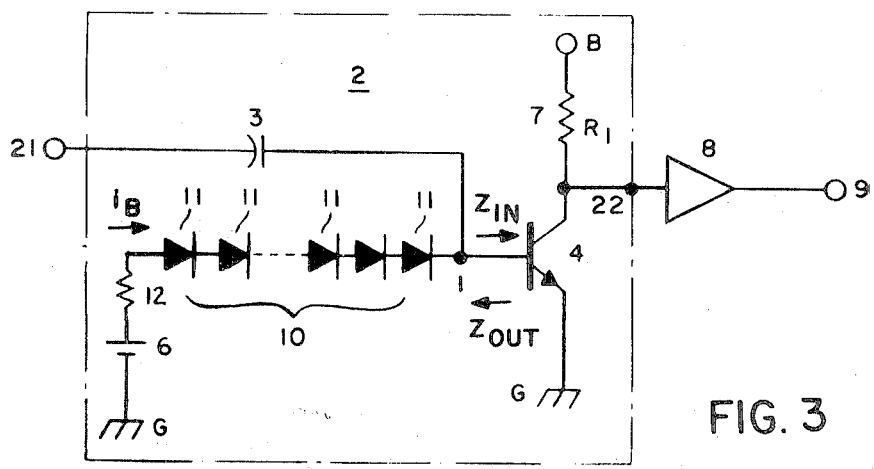
FIG. 3 is a schematic diagram of a preferred embodiment of the present invention. In all the figures, corresponding components are designated with identical symbols.

In reference to the preferred embodiment of the present invention, a row of diodes consisting of an adequate number of diodes, and a resistor are serially connected between the bias voltage source and the base of the transistor under test. FIG. 3 indicates the outline of a transistor noise measuring circuit embodying the present invention. According to the figure, 2 represents a transistor-operating circuit for setting specified operating condition of the transistor under test 4. In this circuit, an NPN-type transistor 4 is connected in the common emitter configuration. 6 denotes a bias voltage source, and 10 denotes a diode row consisting of an adequate number of diode elements 11 serially connected with a resistor 12. The connection polarity of all diodes is identical, and base current $I_B$ supplied from the bias voltage source to the base is conducted in forward direction through the diodes. Further, in reference to the Figures, 21 is the connection terminal for an external noise signal source or calibration signal source (neither is shown in the figures), and 3 is a coupling capacitor between this terminal and the base electrode, and for the purpose of measuring noise current source $i_N$, the capacitance of capacitor 3 should be so small that the internal impedance of the external signal source will not affect the measurement of the noise current source, and also that it may be regarded as a constant. 7 indicates the collector load resistor, and 8 represents amplifiers installed for the purpose of amplifying the noise produced by transistor circuit 2, and to its output 9 are connected the noise-measuring apparatus (not shown) for measuring the amplified noise.

In reference to the present preferred embodiment, all the diodes numbered 11 are so connected that the base current $I_B$ supplied by bias voltage source 6 to the base flows in the forward direction of the diodes. If the number of diodes in the series connection is $N$ and if the base current at all times is much larger than the saturation current of the diodes, the impedance of the series connection can be written as $$Z_{OUT} = N \frac{mkT}{qI_B} + R_B$$

where $m$ depends on the diodes used, $1 \leq m \leq 2$, and $R_B$ is the resistor 12 in FIG. 3. From this we find $$Z^2_{OUT} = N^2 \left(\frac{mkT}{qI_B}\right)^2 + 2N \frac{mkT}{qI_B} R_B + R_B^2$$

To insure that in the output noise of the transistor the contribution from $e_N$ is much smaller than that from $i_N$, we require
$$Z_{OUT} \gg e_N/i_N$$
For a bipolar transistor the highest possible value of $\overline{e_N^2}/\overline{i_N^2}$ is:

$$\left(\frac{kT}{qI_E}\right)^2 (\beta+1) + \frac{2kTr_b'(\beta+1)}{qI_E} + r_b'^2$$

$$= \left(\frac{kT}{qI_B}\right)^2 \frac{\beta+1}{(B+1)^2} + \frac{2kTr_b'}{qI_B} \frac{\beta+1}{B+1} + r_b'^2$$

here $\beta$ is the common emitter low-frequency current gain of the transistor and $B$ is the common emitter DC current gain. It is known that $$\frac{\beta+1}{B+1} \leq 2$$

By comparing above expressions for $Z^2_{OUT}$ and $\overline{e_N^2}/\overline{i_N^2}$ we find that $Z_{OUT} \gg e_N/i_N$ if $N \gg 1$ and $R_B \gg r_b'$. For $r_b'$ we use the largest expected value for all transistors to be measured. If the diodes generate only shot noise, the mean squared voltage across $N$ diodes and resistor $R_B$ is:

$$2qI_B \cdot \left(\frac{mkT}{qI_B}\right)^2 \cdot N + 4kTR_B \quad (V^2/Hz)$$

the corresponding mean squared current is:

$$\frac{2qI_B \left(\frac{mkT}{qI_B}\right)^2 N + 4kTR_B}{\left(\frac{mkT}{qI_B} N + R_B\right)^2} \quad (A^2/Hz)$$

which can be found to be less than or equal to $\frac{2qI_B}{N}$.

The minimum value of $\overline{i_N^2}$ for a bipolar transistor is:

$$\frac{2qI_E}{\beta+1} = 2qI_B\frac{B+1}{\beta+1}$$

so by choosing $N$ sufficiently large the noise current generated by the series combination of diodes and resistor will be much smaller than the minimum value of $i_N$.

Thus, the series combination of diodes and resistor used to supply the base current permits measurement of $i_N$ of a bipolar transistor for a wide range of base current, and the range of voltage drop across the series combination will be compressed. In practice, $N$ is typically 20 to 30 and this limits the error in the reading of $i_N$ to approximately 3 to 5 percent. Also, in practice, the value of the resistor connected in series with the plurality of diodes is typically about 20 times the maximum expected values of the $r_b'$ of the transistors to be measured and the value of this resistor is usually greater than approximately 1 kilohm.

I claim:
1. A circuit for measuring the equivalent input current noise of a bipolar transistor under test having input and output signal ports, the circuit comprising:
   first bias supply means for supplying a selected value of bias signal to the input port of a transistor under test;
   at least approximately 20 diodes and a resistor serially connected in common conduction direction between said first bias supply means and the input port of a transistor under test, said common conduction direction forward biasing said diodes for bias signal supplied therethrough to the input port of the transistor under test;
   second bias signal supply means connected to the output port of the transistor under test for supplying a selected value of bias signal thereto; and
   circuit means coupled to the output port of the transistor under test for supplying an output representative of the noise signal produced by the transistor under test.

* * * * *

UNITED STATES PATENT OFFICE
CERTIFICATE OF CORRECTION

Patent No. 3,621,394          Dated November 16, 1971

Inventor(s) Knud Knudsen

It is certified that error appears in the above-identified patent and that said Letters Patent are hereby corrected as shown below:

Column 1, line 30, "(2KI)" should read -- (2kT) --.

Signed and sealed this 23rd day of May 1972.

(SEAL)
Attest:

EDWARD M. FLETCHER, JR.          ROBERT GOTTSCHALK
Attesting Officer          Commissioner of Patents